United States Patent [19]
Buschur et al.

[11] Patent Number: 5,881,630
[45] Date of Patent: Mar. 16, 1999

[54] APPARATUS AND METHOD OF CONTROLLING FLUID FLOW BETWEEN A PLURALITY OF VEHICLE COMPONENTS

[75] Inventors: Jeffrey J. Buschur, Bellbrook; John S. Hill, Dayton, both of Ohio

[73] Assignee: ITT Automotive Electrical Systems, Inc., Auburn Hills, Mich.

[21] Appl. No.: 780,457

[22] Filed: Jan. 8, 1997

Related U.S. Application Data

[63] Continuation-in-part of Ser. No. 680,482, Jul. 15, 1996, Pat. No. 5,669,461, which is a continuation of Ser. No. 400,927, Mar. 9, 1995, Pat. No. 5,535,845.

[51] Int. Cl.⁶ .............................. F15B 11/00; F16D 31/02
[52] U.S. Cl. ................................ 91/516; 91/532; 60/426; 60/468; 60/494
[58] Field of Search .............................. 91/511, 514, 516, 91/532; 60/468, 494, 426

[56] References Cited

U.S. PATENT DOCUMENTS

| | | | |
|---|---|---|---|
| 3,641,879 | 2/1972 | Week et al. ................................. | 91/412 |
| 4,005,636 | 2/1977 | Dunn ........................................... | 91/31 |
| 4,043,419 | 8/1977 | Larson et al. ............................. | 180/132 |
| 4,075,840 | 2/1978 | Jesswein .................................... | 60/422 |
| 4,130,990 | 12/1978 | Amedei et al. ........................... | 60/422 |
| 4,144,946 | 3/1979 | Melocik .................................... | 180/132 |
| 4,174,018 | 11/1979 | Liebert et al. ............................ | 180/132 |
| 4,179,888 | 12/1979 | Goscenski, Jr. ........................... | 60/420 |
| 4,189,919 | 2/1980 | Goscenski, Jr. ........................... | 60/420 |
| 4,410,058 | 10/1983 | Dymond .................................... | 180/143 |
| 4,414,809 | 11/1983 | Burris ........................................ | 60/424 |
| 4,446,697 | 5/1984 | Goscenski, Jr. ........................... | 60/443 |
| 4,463,557 | 8/1984 | Miller et al. .............................. | 60/422 |
| 4,470,259 | 9/1984 | Miller et al. .............................. | 60/422 |
| 4,488,569 | 12/1984 | Rau ........................................... | 137/101 |
| 4,556,078 | 12/1985 | Wittren .................................... | 91/516 X |
| 4,625,751 | 12/1986 | Gage ......................................... | 137/118 |
| 4,664,210 | 5/1987 | Yamaoka et al. ........................ | 180/132 |
| 4,738,330 | 4/1988 | Suzuki et al. ............................. | 180/141 |
| 4,966,066 | 10/1990 | Kauss et al. .............................. | 91/516 |
| 5,293,952 | 3/1994 | Ledamoisel et al. .................... | 180/132 |
| 5,398,505 | 3/1995 | Oogushi et al. ......................... | 91/532 X |
| 5,471,908 | 12/1995 | Lech ........................................... | 91/532 X |
| 5,487,403 | 1/1996 | Mollo ....................................... | 91/516 X |
| 5,535,845 | 7/1996 | Buschur .................................... | 180/417 |
| 5,669,461 | 9/1997 | Buschur .................................... | 180/417 |

FOREIGN PATENT DOCUMENTS

| | | |
|---|---|---|
| 0042682 | 12/1981 | European Pat. Off. . |
| 7901084 | 12/1979 | WIPO . |

OTHER PUBLICATIONS

"Hydraulic Multiverbrauchersesteme", *Technisce Rundschau*, No. 13, Mar. 29, 1993.

*Primary Examiner*—Hoang Nguyen
*Attorney, Agent, or Firm*—J. Gordon Lewis

[57] ABSTRACT

A fluid control system for powering vehicle accessories includes a pump for generating a supply flow of hydraulic fluid. The system also includes a fluid valve assembly having a housing which includes an inlet, a first outlet, a second outlet, and a third outlet defined therein. The inlet is in fluid communication with the supply flow of fluid. The fluid valve assembly provides (1) a first fluid path between the inlet and the first outlet, (2) a second fluid path between the inlet and the second outlet, and (3) a third fluid path between the inlet and the third outlet. The system also includes a fan motor for rotating an engine cooling fan. The fan motor is in fluid communication with the first outlet. Moreover, the system includes a steering control circuit which is in fluid communication with the second outlet. The system further includes a reservoir which is in fluid communication with the third outlet. A method of controlling fluid flow between a plurality of vehicle components is also disclosed.

41 Claims, 2 Drawing Sheets

APPARATUS AND METHOD OF CONTROLLING FLUID FLOW BETWEEN A PLURALITY OF VEHICLE COMPONENTS

CROSS-REFERENCE TO RELATED APPLICATIONS

This application is a continuation-in-part of Ser. No. 08/680,482 filed Jul. 15, 1996, now U.S. Pat. 5,669,461, which is a continuation of Ser. No. 08/400,927 filed Mar. 9, 1995, now U.S. Pat. No. 5,535,845.

BACKGROUND OF THE INVENTION

The present invention relates generally to fluid circuits, and more particularly to an integrated fluid control valve manifold of a fluid control system for powering vehicle accessories such as a cooling fan and a power steering unit.

Many vehicles include an engine cooling fan, with some being driven by a hydraulic motor. For economic reasons, it is known to provide an integrated fluid control circuit in these vehicles which includes both a fluid control circuit for operating an engine cooling fan, and a fluid control circuit for operating a hydraulic-assisted steering linkage. Such integrated fluid control circuits provide the necessary operational pressure for proper functioning of the fluid circuit with a single fluid pump. The use of a single fluid pump reduces costs associated with manufacturing the vehicle.

It is desirable to position the fluid components associated with the engine cooling fan in a series configuration with the fluid components associated with the hydraulic-assisted steering linkage. Such a series configuration creates a first pressure drop across the fluid components associated with the engine cooling fan and a second pressure drop across the fluid components associated with the hydraulic-assisted steering linkage. Such a configuration defines an integrated fluid control circuit wherein an output pressure on a fluid supply line of the single fluid pump fluctuates (i.e. rises and falls) as a function of the sum of the two pressure drops.

The pressure drop across each of the two groups of fluid components may vary widely depending on operating conditions associated with the vehicle. For example, on hot days the fluid pressure requirements associated with the engine cooling fan will increase. If during such a hot day the operator of the vehicle executes a steering maneuver that requires a large amount of fluid pressure (e.g. an abrupt, sharp turn), the sum of the two fluid pressure requirements may exceed the fluid pressure generating capabilities of the single fluid pump.

In such situations as described above wherein the fluid pressure requirements of the two groups of fluid components exceeds the pressure generating capabilities of the single fluid pump, it is desirable to give priority to the fluid components associated with the hydraulic-assisted steering linkage over the fluid components associated with the engine cooling fan. In particular, it is desirable to bypass fluid pressure around the fluid components associated with the engine cooling fan and direct the fluid pressure to the fluid components associated with the hydraulic-assisted steering linkage thereby reducing the speed of the engine cooling fan.

In addition, it is desirable to control the overall fluid pressure of the integrated fluid control circuit. In particular, it is desirable to provide fluid pressure necessary to operate the fluid components associated with the engine cooling fan and the hydraulic-assisted steering linkage while not exceeding the operative range of the pressure generating capabilities of the single fluid pump.

Still further, it is desirable to reduce the number of discrete fluid components included in the integrated fluid control circuit. In particular, it is desirable to provide a fluid valve manifold which can integrate one or more of the functions associated with the integrated fluid control circuit such as a pressure relief function and a bypass function into a single component. Additionally, it may be desirable to integrate other functions and/or components associated with the integrated fluid control circuit into the fluid valve manifold such as a fan motor associated with the engine cooling fan, and/or a flow control valve and a pressure relief valve associated with the hydraulic-assisted steering linkage. Such an integrated fluid valve manifold would provide for increased design efficiency and decreased manufacturing costs of the vehicle.

What is needed therefore is an apparatus and method that gives priority to the advancement of fluid pressure to the fluid components associated with the hydraulic-assisted steering mechanism over the fluid components associated with the engine cooling fan. What is further needed is an apparatus and method that controls on the overall pressure associated with the integrated fluid control circuit. What is also needed is a means to regulate and compensate flow as a function of engine speed. What is yet further needed is an apparatus and method that integrates one or more of the functions of the integrated fluid control circuit into a single fluid valve manifold.

SUMMARY OF THE INVENTION

In accordance with one embodiment of the present invention, there is provided a fluid control system for powering vehicle accessories. The system includes a pump for generating a supply flow of hydraulic fluid. The system also includes a fluid valve assembly having a housing which includes an inlet, a first outlet, a second outlet, and a third outlet defined therein. The inlet is in fluid communication with the supply flow of fluid. The fluid valve assembly provides (1) a first fluid path between the inlet and the first outlet, (2) a second fluid path between the inlet and the second outlet, and (3) a third fluid path between the inlet and the third outlet. The system also includes a fan motor for rotating an engine cooling fan. The fan motor is in fluid communication with the first outlet. Moreover, the system includes a steering control circuit which is in fluid communication with the second outlet. The system further includes a reservoir which is in fluid communication with the third outlet.

In accordance with a second embodiment of the present invention, there is provided a method of controlling fluid flow between a plurality of vehicle components. The method includes the steps of generating a supply flow of fluid with a pump. The method further includes the step of providing a fluid valve assembly having a housing which includes an inlet, a first outlet, a second outlet, and a third outlet defined therein, the inlet being in fluid communication with the supply flow of fluid, and the fluid valve assembly provides (1) a first fluid path between the inlet and the first outlet, (2) a second fluid path between the inlet and the second outlet, and (3) a third fluid path between the inlet and the third outlet. Moreover, the method includes the step of selectively advancing the supply flow of fluid to a fan motor through the first fluid path. The method also includes the step of selectively advancing the supply flow of fluid to a steering control circuit through the second fluid path. The method further includes the step of selectively advancing the supply flow of fluid to a reservoir through the third fluid path.

In accordance with another embodiment of the present invention, there is provided a fluid control system for powering vehicle accessories. The system includes a mechanism for generating a supply flow of hydraulic fluid. The system also includes a fluid valve assembly having a housing which includes an inlet, a first outlet, a second outlet, and a third outlet defined therein. The inlet is in fluid communication with the supply flow of fluid. The fluid valve assembly provides (1) a first fluid path between the inlet and the first outlet, (2) a second fluid path between the inlet and the second outlet, and (3) a third fluid path between the inlet and the third outlet. The system further includes a mechanism for rotating an engine cooling fan. The rotating mechanism is in fluid communication with the first outlet. The system also includes a mechanism for assisting movement of a steering linkage. The steering linkage movement mechanism is positioned in fluid communication with both the rotating mechanism and a bypass therearound. The system moreover includes a mechanism for storing a quantity of fluid. The fluid storage mechanism is positioned in fluid communication with the third outlet.

It is therefore an object of the present invention to provide a new and useful fluid control system for powering vehicle accessories.

It is a further object of the present invention to a new and useful method of controlling fluid flow between a plurality of vehicle components.

It is yet another object of the present invention to provide a fluid control system for powering vehicle accessories which can give priority to the advancement of fluid pressure to the fluid components associated with the hydraulic-assisted steering mechanism over the fluid components associated with the engine cooling fan.

It is still further an object of the present invention to provide a fluid control system for powering vehicle accessories which controls the overall pressure associated with the fluid control system.

It is moreover an object of the present invention to provide a fluid control system for powering vehicle accessories which reduces the number of components associated with the fluid control system.

Still another object of this mechanism is to compensate for varying pump outputs in response to varying engine speed.

The above and other objects, features, and advantages of the present invention will become apparent from the following description and the attached drawings.

DETAILED DESCRIPTION OF THE INVENTION

Figure 1:
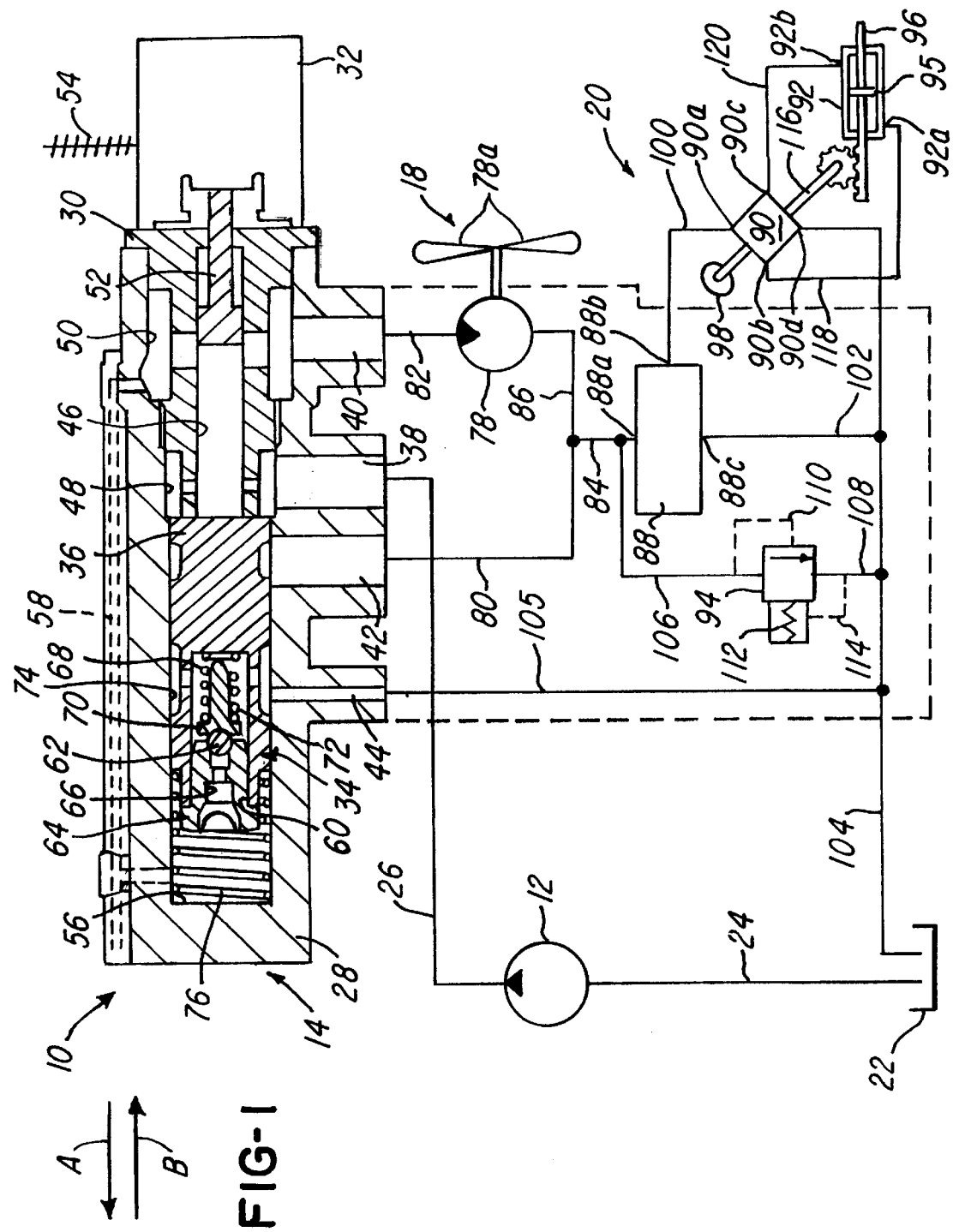
FIG. 1 is a schematic diagram of a first embodiment of a fluid control system which incorporates the features of the present invention therein, with the integrated fluid valve manifold of the first embodiment shown in cross-section for clarity of description.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown an integrated vehicle fluid control system 10. The fluid control system 10 includes an operational pressure source or fluid pump 12, an integrated fluid valve manifold 14, a fan control circuit 18, and a steering control circuit 20.

The fluid pump 12 is operatively coupled to and powered by an engine of a vehicle such as a car or truck (not shown). The fluid pump 12 advances an operation fluid such as hydraulic fluid from a reservoir 22. In particular, an inlet of the fluid pump 12 is coupled to the reservoir 22 via a fluid line 24. An outlet of the fluid pump 12 is coupled to a fluid supply line 26. Hence, operational pressure is created by the flow of operation fluid through the fluid pump 12 and is transmitted via the fluid supply line 26 thereby providing the motive power for the various fluid components associated with the fluid control system 10.

The fluid valve manifold 14 includes a housing 28, a valve body 30, an actuator 32, a relief valve assembly 34, and a plunger 36. The housing 28 includes an inlet 38, a fan outlet 40, a bypass outlet 42, and a relief outlet 44.

The valve body 30 has a fluid chamber 46 defined therein. Also defined within the valve body 30 is a pair of annular chambers 48 and 50. The annular chamber 48 is in fluid communication with the inlet 38, whereas the annular chamber 50 is in fluid communication with the fan outlet 40. Moreover, each of the annular chambers 48 and 50 are in fluid communication with the fluid chamber 46. In the embodiment being described, there is a pressure gradient between chambers 46 and 50 which is maintained by the plunger spring 76 pressure balance. Therefore, the inlet 38 is placed in fluid communication with the fan outlet 40 via a fluid path which includes the annular chamber 48, the fluid chamber 46, and the annular chamber 50.

A piston 52 is movably secured within the fluid chamber 46. More specifically, a first end of the piston 52 is received into the fluid chamber 46, whereas a second end of the piston 52 is mechanically coupled to the actuator 32. The position of the piston 52 provides a pilot control which changes the flow in chamber 50 and 46 to maintain the aforementioned pressure balance. In particular, the piston 52 may be moved in the general direction of arrow A of FIG. 1 so as to position the piston 52 in a number of fan speed positions wherein the piston 52 restricts the flow of operation fluid into the annular chamber 50 and hence the fan outlet 40. It should be appreciated that the further the piston 52 is moved in the general direction of arrow A, the less flow is required from 48 to 50 to maintain the aforementioned plunger pressure balance.

A first end of a signal line 54 is electrically coupled to the actuator 32, whereas a second end of the signal line 54 is electrically coupled to an electronic control unit (not shown). The electronic control unit generates a number of control signals on the signal line 54 which cause the actuator 32 to position the piston 52 into one of a number of predetermined fan speed positions. It should be appreciated that the actuator 32 may be any type of electromechanical device which is capable of selectively moving the piston 52 such as a solenoid or a stepper motor.

The housing 28 has a relief chamber 56 defined therein. The relief chamber 56 is in fluid communication with the annular chamber 50. In particular, the relief chamber 56 is coupled to the annular chamber 50 via a pressure sense passage 58. The sense passage 58 fluidly communicates the magnitude of the operational pressure within the fluid chamber 50 and to the relief chamber 56.

The plunger 36 is positioned within the relief chamber 56 and regulates the flow passing from chamber 46 to bypass 42 in order to maintain the flow dictated by the position of piston 52 such that the predetermined pressure drop from 46 to 50 is maintained, regardless of flow variations at inlet 38. This force balance of pressure in 46 vs. pressure in downstream 50 plus the spring force exerted by spring 76 is a well known means of regulation common in the art. Moreover, the plunger 36 has a recess 60 defined therein. The relief valve assembly 34 is positioned in the recess 60 as shown in FIG. 1. The relief valve assembly 34 includes a ball 62, and a ball seat 64 having a fluid channel 66 extending therethrough. The relief valve assembly 34 further includes a ball retaining spring 68 and a guide member 70, both of which are disposed in a spring chamber 72 which is part of the recess 60.

Thus, it should be appreciated that if there is a pressure differential between chamber 66 and 44 which exceeds a predetermined limit, then flow through chamber 66 will be diverted to chamber 44. This, in turn, causes piston 36 to shift in the direction of arrow A, thereby causing flow to be discharged from chamber 46 to chamber 42, thereby bypassing the fan 78 and driving steering system 20 directly. This is achieving two objectives, namely, prioritization of steering system 20 over fan 78 and secondly, maintaining a pressure limitation or relief on pump 12 and supply line 26.

The retaining spring 68 biases the ball 62 against the ball seat 64 thereby blocking the fluid channel 66. If operational pressure within the fluid channel 66 is large enough in magnitude so as to overcome the bias of the retaining spring 68, the ball 62 is moved away from the ball seat 64, thereby permitting operation fluid to advance through the fluid channel 66 and into the spring chamber 72.

The plunger 36 also includes an annular chamber 74 defined therein. The annular chamber 74 is in fluid communication with the spring chamber 72 and the relief outlet 44. Hence, the relief outlet 44 is in fluid communication with the inlet 38 via a fluid path which includes the annular chamber 48, the fluid chamber 46, the annular chamber 50, the sense passage 58, the relief chamber 56, the fluid channel 66, and the annular chamber 74. In turn, the relief outlet 44 is in fluid communication with the reservoir 22. In particular, the relief outlet 44 is coupled to the reservoir 22 via a fluid path which includes an exhaust line 105 and a drain line 104.

A spring 76 is disposed in the relief chamber 56 and contacts a first end of the plunger 36. The spring 76 urges the plunger 36 in the general direction of arrow B of FIG. 1 so as to cause a second end portion of the plunger 32 to block the bypass port 42.

The fan control circuit 18 includes a fan motor 78 and a fluid bypass line 80. The fan motor 78 is a fluid powered fan motor which is in fluid communication with the fluid valve manifold 14. In particular, an inlet of the fan motor 78 is coupled to the fan outlet 40 of the fluid valve manifold 14 via a fluid line 82. Hence, operational pressure transmitted via the fluid line 82 rotates or otherwise powers the fan motor 78. The fan motor 78 includes a number of fan blades 78a operatively coupled thereto. Rotation of the fan motor 78 causes the fan blades 78a to be likewise rotated thereby creating a flow of air which is used to cool the engine of the vehicle (not shown).

Exhausted or spent operation fluid from the fan motor 78 is exhausted from an outlet thereof. In particular, the outlet of the fan motor 78 is coupled to a fluid inlet line 84 of the steering control circuit 20 via a fluid line 86.

It should be appreciated that if the magnitude of operational pressure exerted on the fan motor 78 is increased, the rotational speed of the fan blades 78a will likewise be increased. Conversely, if the magnitude of operational pressure exerted on the fan motor 78 is decreased, the rotational speed of the fan blades 78a will likewise be decreased. Therefore, if the piston 52 is urged in the general direction of arrow B, the rotational speed of the fan blades 78a is increased, whereas if the piston 52 is urged in the general direction of arrow A, the rotational speed of the fan blades 78a is decreased.

The fluid bypass line 80 is arranged in a parallel flow relationship with the fan motor 78. More specifically, a first end of the fluid bypass line 80 is coupled to the bypass outlet 42 of the fluid valve manifold, whereas a second end of the bypass valve 80 is coupled to the fluid inlet line 84 of the steering control circuit 20.

The steering control circuit 20 includes a flow control valve 88, a rotary valve 90, a fluid cylinder 92, and a pressure relief valve 94. The fluid cylinder 92 includes a piston 95 coupled to a shaft 96. A first end of the shaft 96 is coupled to a first portion of a steering linkage (not shown) of the vehicle, whereas a second end of the shaft 96 is coupled to a second portion of the steering linkage (not shown) of the vehicle. Movement of the shaft 96 provides the motive power for moving the steering linkage thereby reducing the amount of force which the operator of the vehicle must exert on a steering wheel 98 of the vehicle in order to steer the vehicle.

The steering control circuit 20 is in fluid communication with the fan control circuit 18. In particular, an inlet 88a of the flow control valve 88 is coupled to the fan motor 78 via a fluid path which includes the fluid line 86 and the inlet line 84, whereas the inlet 88a is further coupled to the bypass flow line 80 via the fluid inlet line 84.

The flow control valve 88 is arranged in fluid communication with the rotary valve 90 and the reservoir 22. More specifically, an operation outlet 88b of the flow control valve 88 is coupled to an inlet 90a of the rotary valve 90 via a fluid line 100, whereas an exhaust outlet 88c of the flow control valve 88 is coupled to the reservoir 22 via a fluid path which includes an exhaust line 102 and the drain line 104.

The flow control valve 88 directs a flow of a first predetermined magnitude to the rotary valve 90. In particular, a flow of a second predetermined magnitude is advanced from the fan control circuit 18 to the inlet 88a of the flow control valve 88 wherein the flow control valve 88 directs a flow of the first predetermined magnitude to the inlet 90a of the rotary valve 90, whereas the remainder of the operation fluid advancing through the flow control valve 88 is exhausted to the reservoir 22 via the exhaust outlet 88c.

Operational pressure of the operation fluid advancing into the flow control valve 88 is controlled by the pressure relief valve 94. The pressure relief valve 94 is a two-position, pilot-actuated valve. The pressure relief valve 94 is in fluid communication with the fluid inlet line 84 and the reservoir 22. In particular, an inlet of the pressure relief valve 94 is coupled to the fluid inlet line 84 via a fluid line 106, whereas an outlet of the pressure relief valve 94 is coupled to the drain line 104 via an exhaust line 108.

The pressure relief valve 94 further includes a pilot signal input line 110 and a spring 112. A biasing force created by the spring 112 urges the pressure relief valve 94 in the general direction of arrow B of FIG. 1 thereby positioning the relief valve 94 into a fluid obstructing position as shown in FIG. 1. The biasing force of the spring 112 is overcome when operational pressure of a predetermined value is present on the pilot signal input line 110, thereby moving the pressure relief valve 94 in the general direction of arrow A of FIG. 1 and into a fluid transmitting position. The pilot signal input line 110 is exhausted via an exhaust line 114.

The rotary valve 90 is operatively coupled to a steering column 116 of the vehicle. More specifically, if the steering wheel 98 and hence the steering column 116 of the vehicle is rotated in a leftwardly direction, operation fluid is advanced from the inlet 90a through a left outlet 90b. Thereafter, operation fluid is advanced to a fluid port 92a of the fluid cylinder 92 via a fluid line 118 thereby urging the piston 95 and hence the shaft 96 in the general direction of arrow B of FIG. 1. It should be noted that movement of the shaft 96 in the general direction of arrow B assists the operator of the vehicle in executing a leftward turn of the steering linkage of the vehicle (not shown).

Spent or exhausted operation fluid is then advanced from the fluid cylinder 92 via a fluid port 92b and thereafter is advanced back to the rotary valve 90 via a fluid line 120. After which, spent operation fluid is exhausted from the rotary valve 90 through the exhaust outlet 90d and is advanced to the reservoir 22 via the drain line 104.

Conversely, if the steering wheel 98 and hence the steering column 116 of the vehicle is rotated in a rightwardly direction, operation fluid is advanced from the inlet 90a through a right outlet valve 90c. Thereafter, operation fluid is advanced to the fluid port 92b of the fluid cylinder 92 thereby urging the piston 95 and hence the shaft 96 in the general direction of arrow A of FIG. 1. It should be noted that movement of the shaft 96 in the general direction of arrow A assists the operator of the vehicle in executing a rightward turn of the steering linkage of the vehicle (not shown).

Spent or exhausted operation fluid is then advanced from the fluid cylinder 92 via the fluid port 92a and thereafter is advanced back to the rotary valve 90 via the fluid line 118. After which, spent operation fluid is exhausted from the rotary valve 90 through the exhaust port 90d and is advanced to the reservoir 22 via the drain line 104.

In operation, operation fluid is advanced from the fluid pump 12 to the inlet 38 of fluid valve manifold 14. The actuator 32 receives input signals from the electronic control unit (not shown) via the signal line 54. If the electronic control unit determines that the engine of the vehicle is in need of an augmented fan air flow (e.g. the engine temperature is above a predetermined control limit), the actuator 32 causes the piston 52 to be urged in the general direction of arrow B. Hence, the flow of operation fluid advanced to the fan motor 78 will be increased thereby increasing the rotational speed of the fan motor 28.

When the fan motor 78 is operated at a high speed, a larger operational pressure drop occurs across the fan control circuit 18 than when the fan motor 78 is operated at a low speed thereby increasing the magnitude of the operational pressure which the fluid pump 12 must generate in order to supply operational pressure to the steering control circuit 20 and the fan motor 78.

If the operational pressure in the fluid chamber 50 and hence the pressure sense passage 58, the relief chamber 56, and the fluid channel 66 exceeds a threshold amount, the relief valve assembly 34 is positioned in a fluid transmitting position wherein the bias of the ball retaining spring 68 is overcome thereby removing the ball 62 from the ball seat 64. Thereafter, operation fluid is advanced to the reservoir 22 via a fluid path which includes the spring chamber 72, the annular chamber 74, the relief outlet 44, the exhaust line 105, and the drain line 104. As operation fluid is exhausted from the relief outlet 44, operational pressure in the relief chamber 56 is reduced thereby causing the operational pressure within the fluid chamber 46 to urge the plunger 36 in the general direction of arrow A of FIG. 1. As the plunger is moved in the general direction of arrow A, the plunger 36 is placed in a flow enabling position wherein the bypass outlet 42 is placed in fluid communication with the fluid chamber 46 thereby allowing operation fluid within the fluid chamber 46 to advance into the bypass outlet 42 and hence the fluid bypass line 80. Therefore, the pressure drop across the fan control circuit 18 is reduced thereby providing adequate operational pressure for operating the steering control circuit 20. It should be appreciated that the threshold amount is indicative of an operational pressure which will provide for operation of the steering control circuit 20 under even the most extreme conditions (e.g. heavy, abrupt steering maneuvers).

Once the operational pressure within the fluid chamber 46 and hence the sense passage 58 is reduced below the threshold amount, the plunger assembly 36 is positioned in a fluid obstructing position wherein the bias of the ball retaining spring 68 urges the ball 62 back into contact with the ball seat 64 thereby preventing operation fluid from advancing from the fluid channel 66 to the spring chamber 72. Thereafter, operational pressure within the relief chamber 56 will be increased thereby urging the plunger 36 in the general direction of arrow B of FIG. 1 thereby positioning the plunger 36 in a flow blocking position wherein the fluid chamber 46 is isolated from the bypass outlet 42.

Advantageously, the apparatus and method of the present invention provides a single integrated spool, valve and pilot assembly 28 which simultaneously achieves at least the following objectives. First, the assembly 28 controls speed of motor 78 by controlling flow bypass through chamber 42. The single integrated assembly compensates for varying pump flow rates at chamber 38. The single integrated assembly 28 prioritizes the power available from power steering system 20 over fan motor 78. Moreover, the single integrated assembly 28 limits overall system pressure or provides a system pressure relief utilizing a combination of steering relief valve 94 and valve assembly 28.

Figure 2:
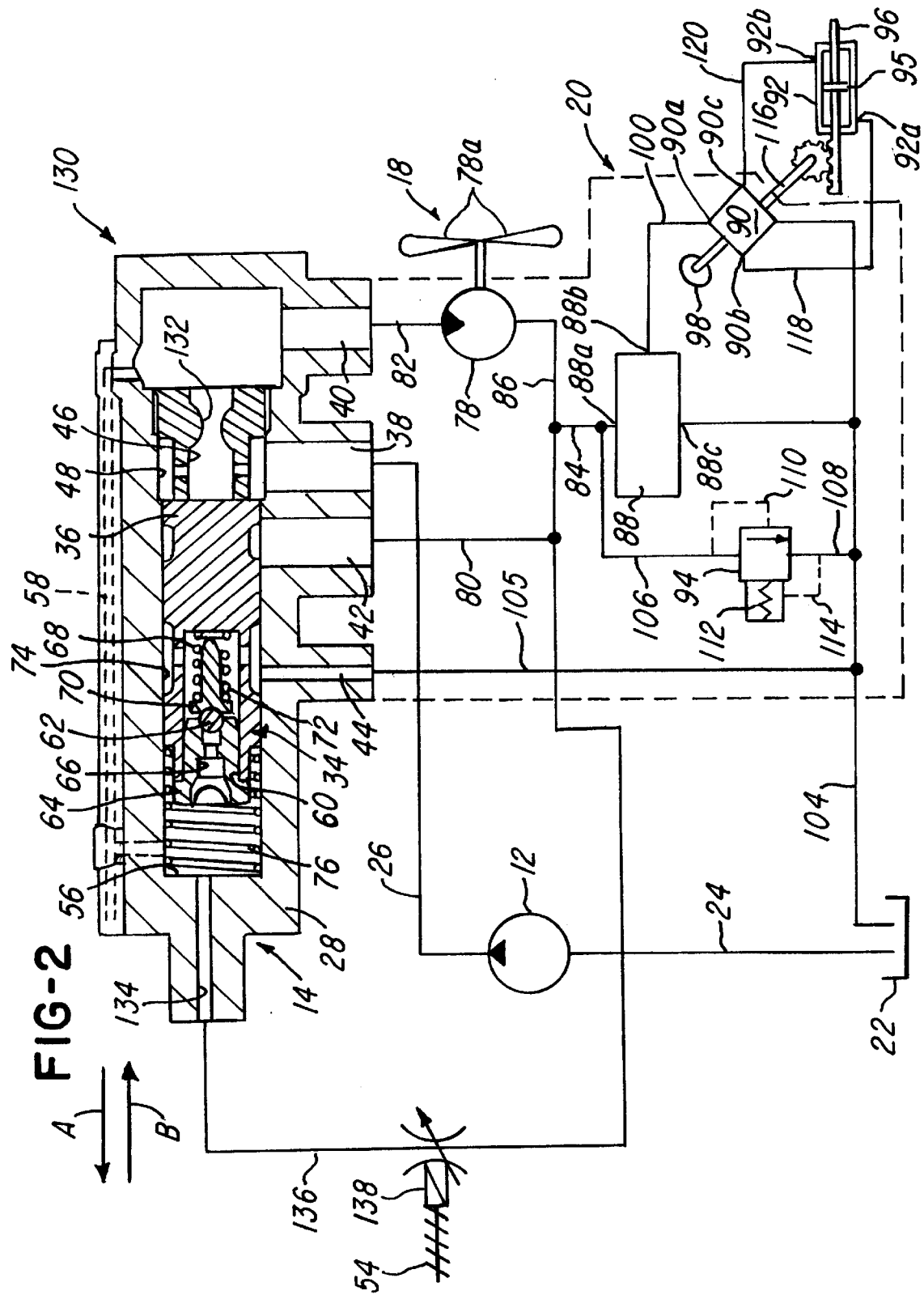
FIG. 2 is a schematic diagram of a second embodiment of the fluid control system of FIG. 1, with the integrated fluid valveassembly manifold of the second embodiment shown in cross-section for clarity of description.

Referring now to FIG. 2, there is shown an integrated vehicle fluid control system 130. The same reference numerals are used in FIG. 2 to designate common components which were previously discussed in regard to FIG. 1. Therefore, no further discussion thereof is warranted.

The integrated vehicle fluid control system 130 includes an orifice 132. The orifice 132 replaces the valve housing 30, the actuator 32 and the piston 52 of the integrated vehicle fluid control system 10 (FIG. 1).

In addition, the housing 28 of the fluid valve manifold 14 includes a drain outlet 134 defined therein. The drain outlet 134 places the relief chamber 56 in fluid communication with bypass line 80. In particular, the drain outlet 134 is coupled to the bypass line 80 via a signal line 136. Disposed in the line 136 is a valve 138. The valve 138 is an electrically-actuated, multi-position flow valve such as a needle valve. The valve 138 is coupled to the electronic control unit (not shown) via the signal line 54. The electronic control unit generates a number of control signals on the signal line 54 which cause the valve 138 to be positioned at one of a number of fan speed positions. Each of the fan speed positions allows for a flow of operation fluid of a predetermined magnitude to advance from the relief chamber 56 to the bypass line 80.

Operational pressure at the fan outlet 40 is varied by the drain valve 138. In particular, if the electronic control unit (not shown) transmits a fan speed control signal to the valve 138 to increase the rotational speed of the fan motor 78. The valve 138 reduces the magnitude of the flow of operation fluid which is permitted to advance through the valve 138, thereby increasing operational pressure in the fan outlet 40 which, in turn, increases rotational speed of the fan motor 78. Conversely, if the electronic control unit transmits a control signal to the valve 138 to decrease the rotational speed of the fan motor 78, the valve 138 increases the magnitude of the flow of operation fluid which is permitted to advance through the valve 138, thereby decreasing operational pressure on the fan outlet 40 which, in turn, decreases rotational speed of the fan motor 78. The above-described mechanism in conjunction with the previously-described function of plunger 36 (FIG. 1) provide means for controlling fan motor 78 speed in response to changes in pressure. In contrast, the embodiment shown in FIG. 1 provides fan motor 78 control in response to changes in flow rate.

As described, the fluid control circuit 10, 130 gives priority to the steering control circuit 20 over the fan control circuit 18 while maintaining the overall pressure load exerted on the fluid pump 12 within an operative range of the pressure generating capabilities of the fluid pump 12. In addition, by including an integrated fluid valve manifold 14, the fluid control circuit 10, 130 reduces the number of discrete fluid components relative other fluid control systems which have heretofore been designed.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

In particular, it should be appreciated that other fluid components within the fluid control circuit 10, 130 could also be included in the integrated fluid valve manifold 14. More specifically, the housing 28 of the fluid valve manifold 14 could be configured so as to include the fan motor 78, the flow control valve 88 and/or the relief valve 94 therein as indicated by the dashed lines in FIGS. 1 and 2. Also, the relief valve 84 may be provided so that it is integrally formed as part of flow control valve 88 as is conventionally known.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A fluid control system for powering vehicle accessories, comprising:
 a pump for generating a supply flow of hydraulic fluid;
 a fluid valve having a housing which includes an inlet, a first outlet, a second outlet, and a third outlet defined therein and having a single spool within said housing to control fluid flow therethrough, said inlet being in fluid communication with said supply flow of fluid, and said fluid valve assembly provides (1) a first fluid path between said inlet and said first outlet, (2) a second fluid path between said inlet and said second outlet, and (3) a third fluid path between said inlet and said third outlet;
 a fan motor for rotating an engine cooling fan, said fan motor being in fluid communication with said first outlet;
 a steering control circuit which is in fluid communication with said second outlet, said fan motor and said steering control circuit being coupled in series; and
 a reservoir which is in fluid communication with said third outlet.

2. The system of claim 1, further comprising a first flow restrictor located within said first fluid path, wherein:
 said first flow restrictor is movable between a first fan speed position and a second fan speed position,
 said fan motor operates at a first speed when said first flow restrictor is positioned at said first fan speed position; and
 said fan motor operates at a second speed when said first flow restrictor is positioned at said second fan speed position.

3. The system of claim 2, further comprising an actuator for moving said first flow restrictor between said first fan speed position and said second fan speed position.

4. The system of claim 2, wherein said first flow restrictor includes a piston which is movable within a chamber of said housing.

5. The system of claim 1, further comprising a second flow restrictor located within said third fluid path, wherein:
 said second flow restrictor is movable between a fluid transmitting position and a fluid obstructing position;
 said supply flow of fluid is advanced to said reservoir through said third outlet when said second flow restrictor is located in said fluid transmitting position; and
 said supply flow of fluid is prevented from advancing to said reservoir through said third outlet when said second flow restrictor is located in said fluid obstructing position.

6. The system of claim 5, wherein said supply flow of fluid is advanced to said steering control circuit through said second outlet when said second flow restrictor is located in said fluid transmitting position, and (2) said supply flow of fluid is prevented from advancing to said steering control circuit through said second outlet when said second flow restrictor is located in said fluid obstructing position.

7. The system of claim 5, wherein:
 said housing having a fourth outlet in fluid communication with said chamber;
 a drain line which couples said fourth outlet to said reservoir; and
 a drain valve which is located within said drain line.

8. The system of claim 1, wherein said second flow restrictor includes:
 a plunger positioned within a chamber of said housing, said plunger being movable between a flow blocking position and a flow enabling position; and
 a spring which biases said plunger into said flow blocking position.

9. The system of claim 8, further comprising a relief valve assembly, wherein:
 said plunger has a recess defined therein; and
 said relief valve assembly is positioned within said recess.

10. The system of claim 9, wherein said relief valve assembly includes:
 a ball seat having a fluid channel extending therethrough; and
 a ball which is biased into contact with said ball seat so as to block said fluid channel of said ball seat.

11. The system of claim 1, further comprising a fluid bypass line, wherein:
said fluid bypass line is positioned in parallel with said fan motor; and
said fluid bypass line is interposed between said second outlet of said housing and said steering control circuit.

12. The system of claim 11, wherein said steering control circuit is operatively coupled to a steering column.

13. The system of claim 1, wherein:
said steering control circuit includes a rotary valve which is operatively coupled to a steering column; and
at least one of said rotary valve and said fan motor is located within said housing of said fluid valve.

14. The system of claim 13, wherein:
said steering control circuit further includes a flow control valve which is in fluid communication with said rotary valve; and
said rotary valve, said flow control valve, and said fan motor are each located within said housing of said fluid valve assembly.

15. A method of controlling fluid flow between a plurality of vehicle components, comprising the steps of:
generating a supply flow of fluid with a pump;
providing a fluid valve assembly having a housing which includes an inlet, a first outlet, a second outlet, and a third outlet defined therein, the inlet being in fluid communication with the supply flow of fluid, and the fluid valve assembly provides (1) a first fluid path between the inlet and the first outlet, (2) a second fluid path between the inlet and the second outlet, and (3) a third fluid path between the inlet and the third outlet, said housing comprising a single spool therein for controlling a flow of fluid through said housing;
selectively advancing the supply flow of fluid to a fan motor through the first fluid path;
selectively advancing the supply flow of fluid to a steering control circuit through the second fluid path;
wherein said fan motor and said steering control circuit are coupled in series; and
selectively advancing the supply flow of fluid to a reservoir through the third fluid path.

16. The method of claim 15, further comprising steps of:
providing a first flow restrictor located within the first fluid path; and
moving the first flow restrictor between a first fan speed position and a second fan speed position, wherein (1) the fan motor operates at a first speed when the first flow restrictor is positioned at the first fan speed position, and (2) the fan motor operates at a second speed when the first flow restrictor is positioned at the second fan speed position.

17. The method of claim 15, further comprising the steps of:
providing a second flow restrictor located within the third fluid path;
moving the second flow restrictor between a fluid transmitting position and a fluid obstructing position, wherein (1) the supply flow of fluid is advanced to the reservoir through the third outlet when the second flow restrictor is located in the fluid transmitting position, and (2) the supply flow of fluid is prevented from advancing to the reservoir through the third outlet when the second flow restrictor is located in the fluid obstructing position.

18. The method of claim 17, wherein the supply flow of fluid is advanced to the steering control circuit through the second outlet when the second flow restrictor is located in the fluid transmitting position, and (2) the supply flow of fluid is prevented from advancing to the steering control circuit through the second outlet when the second flow restrictor is located in the fluid obstructing position.

19. The method of claim 15, wherein:
said steering control circuit includes a rotary valve which is operatively coupled to a steering column; and
at least one of said rotary valve and said fan motor is located within said housing of said fluid valve assembly.

20. The method of claim 19, wherein:
said steering control circuit further includes a flow control valve which is in fluid communication with said rotary valve; and
said rotary valve, said flow control valve, and said fan motor are each located within said housing of said fluid valve assembly.

21. A fluid control system for powering vehicle accessories, comprising:
means for generating a supply flow of hydraulic fluid;
a fluid valve assembly having a housing which includes an inlet, a first outlet, a second outlet, and a third outlet defined therein, said inlet being in fluid communication with said supply flow of fluid, and said fluid valve assembly provides (1) a first fluid path between said inlet and said first outlet, (2) a second fluid path between said inlet and said second outlet, and (3) a third fluid path between said inlet and said third outlet, said housing comprising a single spool therein for controlling a flow of fluid through said housing;
means for rotating an engine cooling fan, said rotating means being in fluid communication with said first outlet;
means for assisting movement of a steering linkage, said steering linkage movement means being positioned both in series and in fluid communication with said rotating means; and
means for storing a quantity of fluid, said fluid storage means being positioned in fluid communication with said third outlet.

22. The system of claim 21, wherein:
said generating means includes a pump;
said rotating means includes a fan motor;
said steering linkage movement means includes a steering control circuit; and
said fluid storage means includes a reservoir.

23. The system of claim 22, further comprising a first flow restrictor located within said first fluid path, wherein:
said first flow restrictor is movable between a first fan speed position and a second fan speed position;
said fan motor operates at a first speed when said first flow restrictor is positioned at said first fan speed position; and
said fan motor operates at a second speed when said first flow restrictor is positioned at said second fan speed position.

24. The system of claim 22, further comprising a second flow restrictor located within said third fluid path, wherein:
said second flow restrictor is movable between a fluid transmitting position and a fluid obstructing position;
said supply flow of fluid is advanced to said reservoir through said third outlet when said second flow restrictor is located in said fluid transmitting position; and said supply flow of fluid is prevented from advancing to said reservoir through said third outlet when said second flow restrictor is located in said fluid obstructing position.

25. The system of claim 22, wherein:
said steering control circuit includes a rotary valve which is operatively coupled to a steering column; and
at least one of said rotary valve and said fan motor is located within said housing of said fluid valve assembly.

26. The system of claim 25, wherein:
said steering control circuit further includes a flow control valve which is in fluid communication with said rotary valve; and
said rotary valve, said flow control valve, and said fan motor are each located within said housing of said fluid valve assembly.

27. A single integrated vehicle hydraulic valve assembly for use with an engine comprising a steering system and a fan motor and a hydraulic pump comprising:
a valve housing having a single spool situated therein, said housing and said single spool cooperating to control fluid flow among said steering system, said fan motor and said hydraulic pump, wherein said steering system and fan motor are coupled in series; and
means situated in said housing and responsive to said hydraulic pump to control flow bypass around said fan motor, for varying pump flow rates at an output to said fan motor, for prioritizing said steering system over said fan motor and also for providing system pressure relief.

28. The single integrated hydraulic valve assembly as recited in claim 27 wherein said means comprises a spool having a relief passage in fluid communication with a reference pressure which is downstream of a prioritized hydraulic load.

29. The single integrated hydraulic valve assembly as recited in claim 28 wherein said prioritized hydraulic load is a steering system.

30. The single integrated hydraulic valve assembly as recited in claim 27 wherein said means comprises a plunger situated in said valve housing, said valve housing comprising at least one first chamber which cooperates with said plunger to ensure that a pressure balance on either end of said plunger is maintained in order to regulate and control a speed of a fan motor.

31. The single integrated hydraulic valve assembly as recited in claim 30 wherein said valve housing comprises at least one second chamber in communication with said at least one first chamber for causing said fan motor to be bypass in response to a bypass pressure.

32. The single integrated hydraulic valve assembly as recited in claim 28 wherein said reference pressure is the pressure at a reservoir.

33. The single integrated hydraulic valve assembly as recited in claim 30 wherein said valve housing comprises at least one third chamber in communication with said at least one first chamber to provide a pressure relief across at least one of said fan motor or steering system.

34. A vehicle fluid control method for controlling fluid to a first hydraulic load and a fan motor; comprising the steps of:
providing a single integrated valve assembly having a valve housing and a single plunger situated in said valve housing;
controlling a fan motor speed using said single integrated valve assembly coupled to a pump;
using said single integrated valve assembly to bypass said fan motor on the occurrence of a bypass condition;
using said single integrated valve assembly to maintain a constant flow rate in response to varying flow rates generated by said pump into the valve assembly; and
prioritizing said first hydraulic load over said fan motor using said single integrated valve assembly,
wherein said first hydraulic load and said fan motor are coupled in series.

35. The vehicle fluid control method as recited in claim 34 wherein said method further comprises the step of:
coupling said single integrated valve assembly to a single integrated steering assembly having a flow control and a relief integrally formed therein.

36. The method of claim 34 wherein said method further comprises the step of:
providing a single integrated valve assembly having a relief passage in fluid communication with a reference pressure which is downstream of a prioritized hydraulic load.

37. The method of claim 34 wherein said first hydraulic load comprises a steering system, said method further comprising the step of:
providing a single integrated hydraulic valve assembly which prioritizes a steering system over said fan motor.

38. The method of claim 34 wherein said first hydraulic load comprises a steering system, said method further comprising the step of:
providing a single integrated hydraulic valve assembly having at least one chamber in fluid communication with a pressure line from a pump and both ends of said plunger to cause said plunger to be maintained in a balance condition.

39. The method of claim 34 wherein said first hydraulic load comprises a steering system, said method further comprising the step of:
providing a single integrated hydraulic valve assembly having a plurality of chambers communicating and arranged to cause said fan motor to be bypass in response to a bypass pressure.

40. The method as recited in claim 34 wherein said method further comprises the step of:
integrally providing a plurality of chambers in said single integrated hydraulic valve assembly which cooperates to provide a pressure relief across at least one of either said fan motor or said first hydraulic load.

41. A vehicle fluid control method for controlling fluid to a first hydraulic load and a fan motor, comprising the steps of:
coupling said fan motor in series to said first hydraulic load;
controlling a fan motor speed;
bypassing said fan motor on the occurrence of a bypass condition;
maintaining a constant flow rate in response to varying flow rates generated by said pump into the valve assembly;
prioritizing said first hydraulic load over said fan motor using said single integrated valve assembly; and
performing the aforementioned steps using a single integrated valve assembly having a single spool coupled to a pump, said first hydraulic load, said fan motor and a fan speed control.

* * * * *